Oct. 29, 1968 C. E. WILD 3,407,581
NUT HARVESTING MACHINES
Original Filed July 2, 1964 3 Sheets-Sheet 2
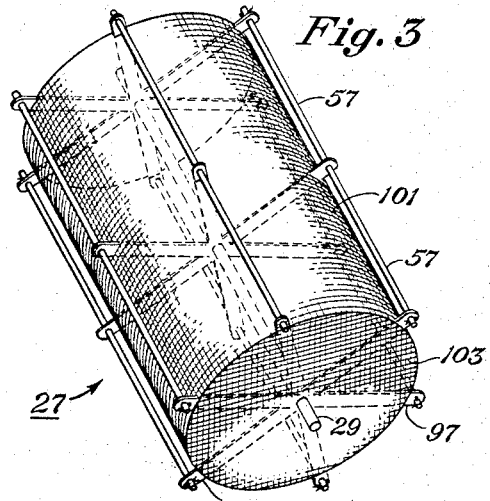
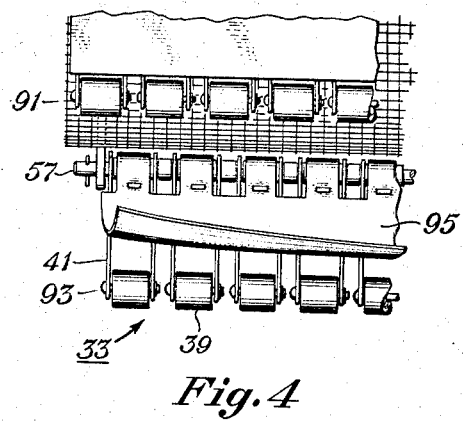
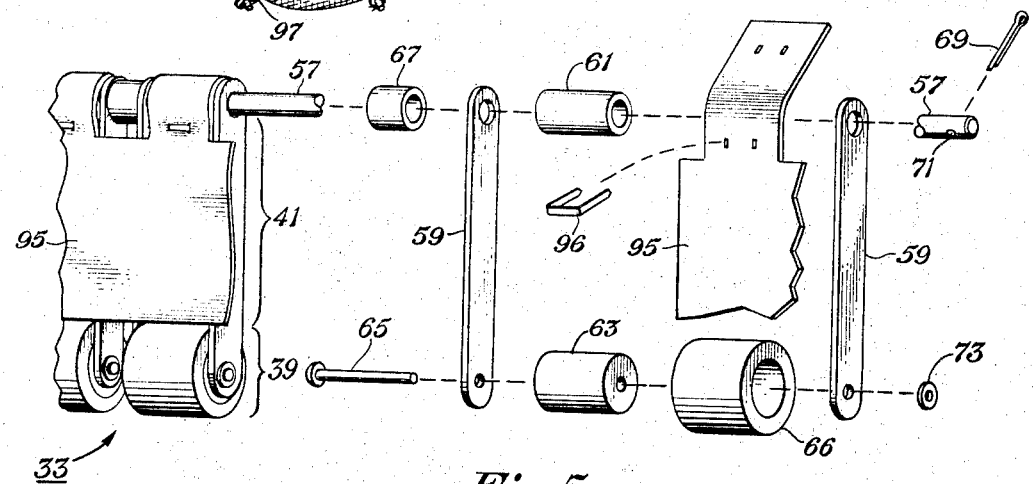
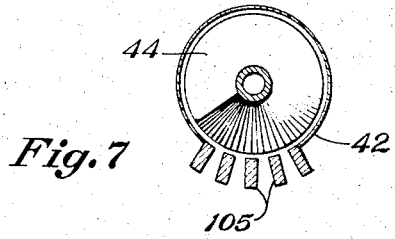
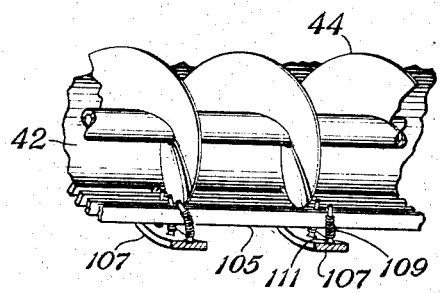
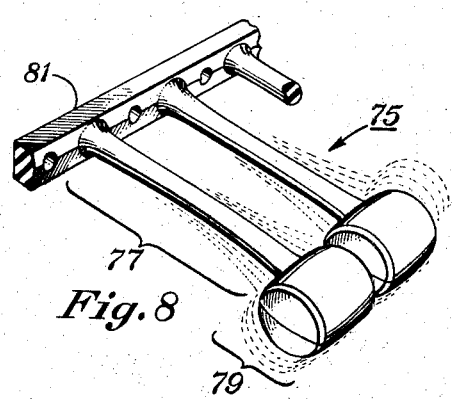
INVENTOR.
Charles E. Wild
BY Wm. T. Wofford
Attorney Oct. 29, 1968    C. E. WILD    3,407,581
NUT HARVESTING MACHINES
Original Filed July 2, 1964    3 Sheets-Sheet 3

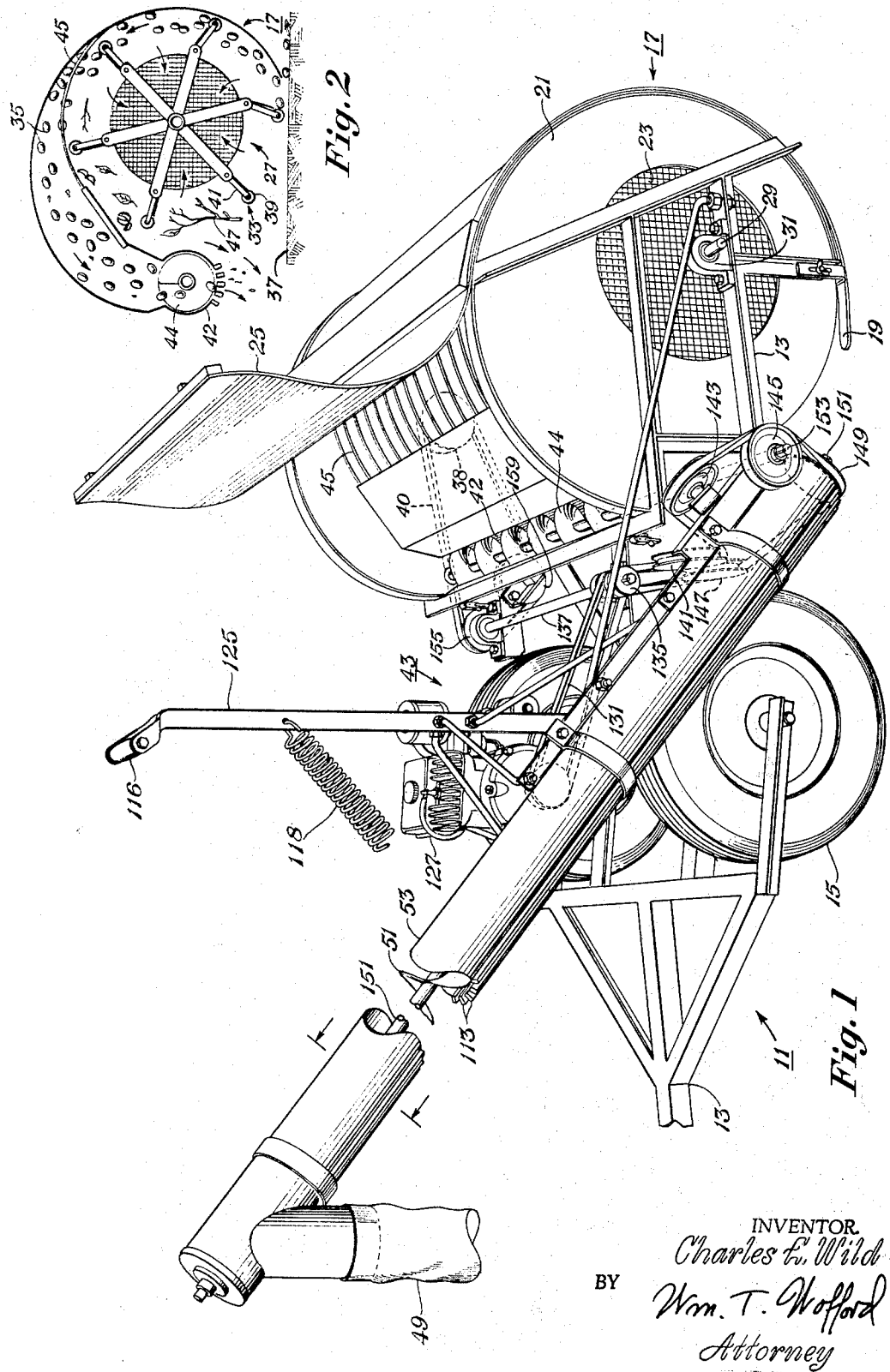

INVENTOR.
Charles E. Wild
BY Wm. T. Wofford
Attorney

United States Patent Office 3,407,581
Patented Oct. 29, 1968

3,407,581
NUT HARVESTING MACHINES
Charles E. Wild, 700 N. East St.,
Arlington, Tex. 76010
Continuation of application Ser. No. 379,918, July 2, 1964. This application May 26, 1967, Ser. No. 641,711
8 Claims. (Cl. 56—328)

ABSTRACT OF THE DISCLOSURE

Following is disclosed a nut harvesting machine utilizing a multiplicity of impellers on a rotating drum. Stem portions of the impellers have one end secured to the drum and the other end supporting protuberant nut impact portions that have at least the exterior thereof formed of a pliable shock absorbing material. The stem portions are pivotally mounted to the drum for free and independent movement of the impellers.

Cross-reference to related application

This application is a continuation of a previously filed application, entitled "Nut Harvesting Machines," Ser. No. 379,918, filed July 2, 1964.

My invention relates in general to harvesting machines and in particular, to those adapted for gathering objects such as nuts and the like from the ground.

Prior art machines for gathering nuts from the ground have achieved only limited commercial success, leaving the harvesting of nuts primarily to hand labor. The increasing cost of labor and its wearisome nature in this area are factors that increase the need for a suitable machine of this type.

The prior art machines with which I am familiar can be broadly divided into three categories: (1) Those having an apparatus which grasps nuts while moving over them, (2) those using impellers which strike the nuts, throwing them into a suitable container, and (3) those which brush the nuts from the ground.

The most apparent disadvantage of prior art machines which grasp the nuts is the difficulty in providing a grasping device which is reliable and can accommodate nuts having large variations in size. Furthermore, such devices encounter difficulty since large amounts of trash such as twigs, limbs, and leaves are often found in orchards, and they seriously interfere with the grasping process or technique.

Prior art machines using impellers to strike the nuts and throw them into a suitable container have a number of disadvantages which have limited their utility. It is quite difficult, for example, to provide impellers that will not damage the nuts and at the same time harvest a large percentage of them.

Another disadvantage of the prior art machines of the impeller type is the likelihood of frequent impeller fatigue failures. The fatigue failure problem is compounded by the fact that the impellers frequently strike the ground, which is usually uneven and rough. Therefore, a successful impeller must be designed to withstand not only the high frequency impact forces generated by striking the nuts, but also the forces of large magnitude generated when the impeller strikes the ground.

To circumvent such problems, inventors have sought ways in which the nuts may be brushed into a suitable container, thus reducing the impeller velocity and the likelihood of failures. Although this approach is basically sound, it is obviously disadvantageous to sweep nuts from the ground since large amounts of foreign matter and trash are thereby collected. It is highly desirable that clean nuts be delivered to the container so that subsequent cleaning steps will be unnecessary.

It is the general object of my invention to provide an improved nut harvester of the impeller type.

Another object of my invention is to provide a nut harvester of the impeller type that will lessen fatigue failures and decrease the number of broken nuts.

Another object of my invention is to provide a nut harvester having little tendency to lift trash from the ground.

Another object is to provide a harvester that cleans nuts in a new and improved manner as they are conveyed to their ultimate destination in the harvester.

These and other objects are effected by my invention as will be apparent from the following description taken in accordance with the accompanying drawings, forming a part of this application, in which:

FIG. 1 is a perspective view showing the general configuration of various structural features of a preferred embodiment of my invention.

FIG. 2 is a schematic side elevational view showing the operation of a portion of the preferred embodiment of FIG. 1.

FIG. 3 is a perspective view, illustrating a preferred construction of the rotating element which supports the impellers.

FIG. 4 is a fragmentary frontal view showing a preferred arrangement and configuration of the impellers and a pliable material which in this embodiment partially covers them.

FIG. 5 is an exploded fragmentary view in perspective, illustrating in better detail the various structural features of the impellers of FIG. 4.

FIG. 6 is a fragmentary perspective view of the horizontal conveyer of FIG. 1.

FIG. 7 is a sectional view of the conveyer of FIG. 6 showing the slotted configuration of its carriage portion.

FIGS. 8 and 9 show alternate embodiments of the impeller.

Figure 10:
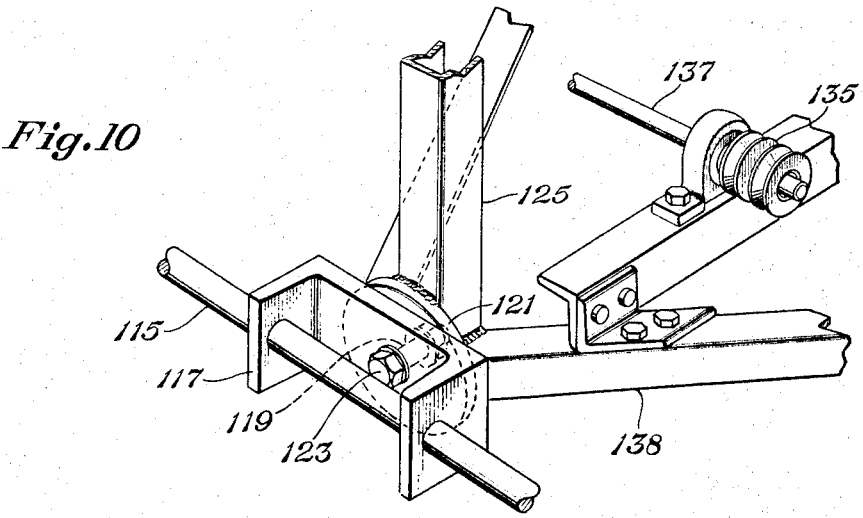
FIG. 10 illustrates in fragmentary perspective the universal mounting used to support various components of my harvester.

Referring now to FIG. 1 for a detailed description of a preferred embodiment of my invention, the numeral 11 designates the harvester in general having a chassis 13 supported by wheels 15. Only portions of the chassis are shown in FIG. 1 since a wide variety of means may be used to support the harvester 11, and the particular support means is not a feature of my invention. Thus, it should be understood that the chassis may be self-propelled or alternatively, may be adapted for connection to a conventional tractor or other propulsion means.

Extending forward from the wheels 15, and supported by the chassis 13, is a housing or guide member 17 which is adapted for skidding engagement with the ground by means of the runners 19. The guide member 17 is generally cylindrical in form, having end portions 21 which are formed of a solid material but which have windows 23 formed of a wire mesh or some other porous screening material. The upper portion 25 of the guide member 17 is flexible and thus adapted for movement to expose the apparatus enclosed therein.

The function of the guide member 17 is to enclose a rotatable member 27 that is not illustrated in FIG. 1 but is shown schematically in FIG. 2. A central shaft 29 supports rotatable member 27 and is connected to the chassis 13 by suitable bearing means 31, as is shown in FIG. 1. Referring once again to FIG. 2, it will be seen that the rotatable member 27 rotates in a counterclockwise direction. A multiplicity of impellers 33 which are free to move pivotally in a plane substantially perpendicular with respect to the rotatable member 27 (at least at the point of contact with the nuts) are mounted thereon to engage the nuts 35 lying on the surface of ground 37. Preferably the impellers 33 are freely pivotal during 360° of rotation of the rotatable member 27.

The impellers 33 have an enlarged protuberant portion 39 mounted on the lower end thereof. The remainder of each impeller 33 is a stem portion 41 which is flexibly or pivotally mounted on the rotatable member 27. The various structural features of the impellers 33 will be discussed in detail later, but meanwhile an over-all description of the harvesting machine will continue.

The central shaft 29 is connected by a pulley 38 and a belt 40 to a power train mechanism which is designated generally by the numeral 43. The power train mechanism may be varied widely to suit the particular needs of the crop being harvested. It is only essential that some means be provided for driving the rotatable member 27 at the desired speed. A particular power trained mechanism will be described, however, to teach those skilled in the art how to make and use my invention, but this will be included later.

Assuming for the present that some means is provided for rotating in a counterclockwise direction the rotatable member 27 and the attached impellers 33, a description of the more salient features of my invention will continue.

As the impellers 33 strike the individual nuts 35, they are propelled forward, being caught and guided in a counterclockwise direction by the housing or guide member 17. As is shown in FIG. 2, the nuts 35 continue in this counterclockwise direction, passing through a screen 45 which preferably has elongated slots as are shown in FIG. 1. These slots have a width sufficient to permit the passage of the nuts 35 but not the passage of larger material such as the twig or limb 47 shown returning to the ground 37 in FIG. 2. The momentum of the nuts 35 is sufficient to carry them to the substantially horizontally disposed first conveyer or auger 44, which communicates with the guide member 17.

The conveyer 44 is rotated by the power train mechanism 43 so that the nuts are directed to the nearest end of the conveyer 44 as seen in FIG. 1. To assist this movement the conveyer is tilted so that the nearest end is slightly lower than the farthest end. Moreover, conveyor 44 is supported in carriage 42 having a configuration which separates small particles of trash such as leaves and the like from the nuts as they move toward the end of the conveyer. The structural details of the carriage 42 and the specific manner in which it cooperates with the auger 44 to accomplish this result will be explained later.

The nuts 35 are transferred to a second conveyer 51 which in this embodiment is an auger as may be seen in FIG. 1, and which is angularly disposed with respect to horizontal. A carriage 53 surrounds the conveyer 51 and is attached to the chassis 13 as are the other components of the harvester 11. The carriage 53 and the enclosed auger 51 cooperate to further clean the nuts as they progress upwardly as will be explained later. Ultimately, the nuts 35 are deposited in a container 49 shown depending from the upper end of the carriage 53.

Having described the over-all features of the embodiment of FIG. 1 and the way they cooperate to achieve the desired results, attention will now be directed to the structural details of the various components.

The salient features of the impellers 33 were discussed with reference to FIG. 2 but the structural details will be more readily apparent with reference to FIGS 4 and 5. As mentioned previously, the general arrangement of the impellers 33 encompasses an elongated stem portion 41 and an enlarged lower portion 39. In the embodiment illustrated in FIGS. 4 and 5, the elongated stem portion 41 is flexibly mounted with respect to a truss 57 which is rigidly mounted on the rotatable member 27.

The term "flexible" means that the impellers 33, or at least portions thereof, are not rigid with respect to the rotatable member 27. In other words, at least the lower portions of the impellers are free to move pivotally through an arc with respect to the rotatable member 27. This is accomplished in the embodiment illustrated in FIGS. 4 and 5 by fabricating the elongated portion 41 with side arms 59. These arms 59 are pivotally attached to truss 57 at their upper end and are separated by a spacer 61 attached to the truss 57.

The lower ends of the side arms 59 are separated by a dowel 63 mounted on a pin 65 secured to the side arms 59. A cylindrical sleeve 66 of pliable material surrounds the dowel 63 which may be seen clearly in FIG. 5 along with the other structural details just described. The assembled impellers 33 are separated on the truss 57 by additional spacers 67.

The truss 57 is preferably releasably secured to the rotatable member 27 by means such as the cotter key 69 inserted in the drill hole 71 at the end of the truss 57.

The dowel 63 and the pliable covering 66 secured thereto are rotatable on the pin 65 and for this reason a washer 73 or a plurality of washers are used in each impeller assembly.

Successful impellers of the FIGS. 4 and 5 type were pivotally or flexibly mounted on a drum so that their extremities swept through a circular path approximately one and one-half feet in diameter at roughly 500 to 600 r.p.m. The dowels 63 were wooden and five-eighths inch diameter and held with one-eighth inch metal pin 65. The side arms 59 were approximately four and one-half inches long; being constructed of thin metal. The pliable covering 66 was rubber of approximately one-eighth inch thickness. This configuration imparted sufficient velocity to the nuts (in this instance pecans) and at the same time reduced breakage to almost nothing.

The reason for making the impellers 33 flexible with respect to the rotatable member 27 is to decrease the likelihood of breakage of the nuts and also to lessen the possibility of fatigue failures in the impellers. In the embodiment just described, a pivotal mounting is used to achieve the desired flexibility. Each impeller 33 upon engaging a nut is free to move relative to the rotatable member 27, thus reducing the stresses resulting from the impact. Considering the large number of impacts imposed on each impeller 33 during its life, the reduction of stresses is a significant accomplishment.

Since impact with the nuts 35 tends to move the impellers 33 through an arc with respect to the rotatable member 27, it is beneficial that the impellers 33 be designed to compensate for the lost rigidity. In other words, it is possible that a nut be moved only slightly upon impact while the impeller 33 moved through a large arc with respect to the rotatable member 27. The desired configuration of the impeller is achieved by applying conservation of momentum principles or, more specifically, by considering the respective masses of the impellers and the nuts. The velocity achieved by the nuts after impact is a function of the mass and the velocity of the impeller. For this reason, the mass of the enlarged portion 39 of the embodiment of FIG. 5 should be relatively large when compared with the mass of the nuts. Preferably, substantially all of the mass of the impeller is concentrated at the lower end portion thereof since this is the portion that engages the nuts.

Increasing the mass of the impeller, especially of the portion 39 which engages the nuts 35, enables the use of smaller impeller velocity. Since the velocity after impact of the nuts 35 is a function of both mass and velocity of the impeller, increasing the mass thereof enables the use of a smaller velocity and, if properly designed, the velocity of the nuts will not be diminished. Decreasing the velocity of the impellers permits a slower rotational speed of the rotatable member 27, a feature which is instrumental in increasing the life of the various components of the harvester 11.

Providing impellers that are flexible with respect to the rotatable member is done in pursuit of a second concept. That is, to decrease breakage of the nuts, the energy transfer time must be increased. Consider, for example, that an egg dropped on a hard concrete floor breaks easily because the concrete has essentially no elasticity. Thus, the transfer of kinetic energy from the egg to the concrete is almost instantaneous and the reactive impact force exerted on the egg by the concrete is extremely large. On the other hand, dropping an egg on foam rubber, even from a surprisingly large height, will not result in breakage because the energy transfer time is greatly increased. Thus, the reactive force exerted on the egg by the concrete is spread over a larger period of time.

In my invention I have in effect decoupled the impeller mass from the rotatable element. By the term "decouple" I mean that the impeller is flexibly instead of rigidly mounted on the rotatable element, so that the impeller is free to move pivotally when it strikes a nut, whereby the energy transfer period is increased, somewhat like placing foam rubber under a falling egg. In other words, the impellers are "decoupled" from the rotating drum, since the impact energy transfer time is made substantially dependent upon the impeller mass, and substantially independent of the mass of the rotating drum.

If the impeller and the rotatable element are rigidly attached, their combined kinetic energies act on the nuts with great likelihood of breakage. In addition, the repetitive forces unfortunately causes fatigue failures in the rigid impellers.

Thus, I believe it is apparent that increasing the energy transfer time by flexibly mounting the impellers 33 is very beneficial.

An alternate embodiment of my invention which carries forth my concept is illustrated in FIG. 8. There, the numeral 75 designates an impeller in general having an elongated stem portion 77 and a lower, enlarged portion 79. In this embodiment the stem portion is fabricated of an elastic material so that the impeller 75 is flexible with respect to the truss 81. Thus, it is apparent that this embodiment will function in a manner similar to the embodiment illustrated in the FIGS. 4 and 5 and previously described.

Figure 9:
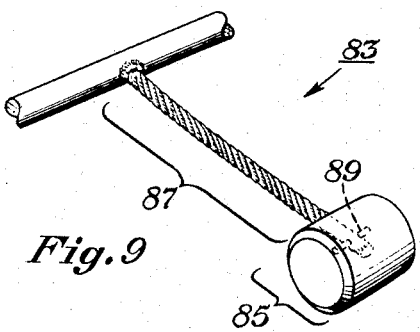

Another embodiment is illustrated in FIG. 9 where the impeller 83 is illustrated with an enlarged lower portion 85 and a flexible stem portion 87. The stem portion 87 of this embodiment is fabricated of a flexible cable and is affixed to the truss 57, and also to the enlarged lower portion 85 by means of a pin 89. This embodiment, like the other two embodiments, is an impeller which is flexible with respect to the rotatable member 27. As in the other embodiments, the lower portion 85 is preferably fabricated of a material which is pliable at least on its outer surface.

The impellers, regardless of the type used, are arranged so that the entire surface area of the ground below the rotatable member 27 is covered by the harvesting action. This is illustrated clearly in FIG. 4 where the impellers are arranged in two rows designated 91 and 93. Row 91 is staggered with respect to row 93 so that during rotation of the rotatable member 27 the entire surface of the ground is covered by the rotating impellers 33. The specific arrangement of the impellers 33 is, of course, a function of their specific geometry. The essential thing, however, is to provide enough impellers so that no nuts are left lying on the ground.

As will be noted in FIGS. 4 and 5, a covering of pliable material 95, secured to spacers 61 by staples 96, is provided in front of each row of impellers 33. This has been found especially beneficial when the side arms 59 of the impellers are fabricated of a hard material such as metal. Since many nuts, such as pecans, have a relatively thin shell, breakage can be decreased in this manner.

In addition to the beneficial results with respect to reducing breakage, the provision of a pliable material 95 in the above manner is beneficial in cleaning the nuts. This can be best explained with reference to FIG. 2 where it will be seen that the provision of the pliable members 95 in front of each row of impellers creates in effect a squirrel cage fan that increases the velocity of the air surrounding the rotatable member 27. Air is forced toward and ultimately through the conveyer 44, since it has a configuration enabling the passage of air and particles smaller than nuts therethrough as will be explained in more detail later. Since the nuts will not pass through the bottom of the conveyer 44, small particles of undesirable material such as leaves, gravel and the like are separated in this manner. As was explained previously, large pieces of undesirable material are separated by the screen 45 which is interposed between the rotatable member 27 and the housing or guide member 17.

The structure of the harvester 11 insures that a minimum of trash and the like is lifted from the ground 37. It will be clear from the foregoing discussion that the cooperative effect of the rotatable member 27 and the surrounding guide member 17 in creating a squirrel cage fan would ordinarily create a region of low pressure air at the ground level 37. I have found it undesirable to create a low pressure zone in this area since this would have the effect of drawing more trash into the guide member 17. Moreover, I have discovered that the low pressure zone may be removed by properly designing the structure of the rotatable member 27 and the guide member 17.

The construction of the rotatable member 27 may best be seen in FIG. 3, where the central shaft 29 is shown supporting a plurality of radially extending spokes 97. The spokes 97 on each end of the rotatable member 27 and those in the center portion thereof are aligned and connected by a plurality of trusses 57 to increase strength.

Inside trusses 57 is a cylindrical shell 101 formed of a porous material, here a wire mesh. This same material is used to construct the end portions 103 of the rotatable element. Consequently, air will flow freely through rotatable member 27. The wire mesh 23 on the end portion 21 of guide member 17 enables air to flow freely through this structure. Thus, the fan effect has little tendency to create a low pressure zone in the air near the ground 37 since the air moves freely into and around the rotatable member 27 and guide member 17. This feature of my invention is beneficial in delivering clean nuts since very little trash is picked up from the ground.

As was previously stated, the substantially horizontally disposed conveyer 44 is arranged to cooperate with the air stream created by the rotatable member 27 to further clean the nuts. Specifically, a plurality of openings are provided on the carriage 42 of the conveyer 44 to permit leaves and the like to fall through the carriage 42. This will be more apparent in view of the sectional view of FIG. 7 where the carriage 42 is shown having a bottom portion fabricated of a plurality of elongated rods 105. As the auger 44 rotates within the carriage 42 and as the air activated by the rotatable member 27 moves across the auger, leaves and the like are forced through the spaces between the elongated rods 105. This arrangement in combination with the structural arrangement of the rotatable member 27 and the guide member 17 provides a very efficient and effective cleaning apparatus.

I have, however, gone farther by providing additional structure which is beneficial in cleaning the trash from the nuts. As will be seen in the fragmentary perspective view of FIG. 6, a plurality of supports 107 are provided near the lower portion of the elongated rods 105 of the carriage 42. On these supports are a plurality of fingers 109 which extend through the space between rods 105 into engagement with the auger 44 as it rotates within the carriage 42. The fingers 109 have lower portions designated 111 which are flexible so that engagement with auger 44 merely pushes them aside. The purpose of these fingers is to add increased cleaning action since I have found that the vibratory action of the fingers 109 is beneficial in agitating and increasing the tendency of the trash to fall through the spaces between the rods 105. Preferably, the flexible portions 111 of rods 109 are fabricated coil spring, although their particular configuration is not especially critical so long as they are adapted for long life.

With reference to FIG. 2 it will be noted that the carriage 42 partially surrounding the auger 44 extends upwardly beyond the longitudinal axis of the auger. This I have found beneficial in preventing pinching and breaking of nuts between the auger blade and the walls of the carriage. If the walls are U-shaped in cross-section the nuts are more likely to be pinched and broken. Therefore, the subject improvement is beneficial in increasing the efficiency of my harvesting machine.

It should be noted that the carriage 53 containing auger 51 also has a plurality of elongated rods 113 on the lower portion thereof so that trash will fall therethrough. Consequently, as the pecans move upwardly through carriage 53, additional cleaning action is provided. By the time the nuts reach the container 49, essentially all the trash has been removed therefrom.

In order to compensate for the rough terrain commonly found in orchards, I have provided a universal mounting for the rotatable element 27 and its related components. The construction of this mounting is apparent in view of FIG. 10 where a first pivot pin 115, which is connected to the chassis 13, is shown with the bracket 117 rotatably secured thereto. A second pivot pin 119 approximately perpendicular to the first pivot pin 105, is secured in the bracket and to a face plate 121. Various structural supports are connected to the face plate 121 and these may be considered as extensions of the chassis 13.

The pivot pin 119 is secured to bracket 117 by suitable releasable means such as the nut 123. This is beneficial since the rotatable member 27 and related apparatus therefor, such as the guide number 17, the conveyers and the power trained mechanism 43 can be separated from the machine. This feature makes the machine especially practicable since the means to propel and power the machine can be conveniently separated therefrom and used for another purpose when the harvesting operation is ceased.

Figure 11:
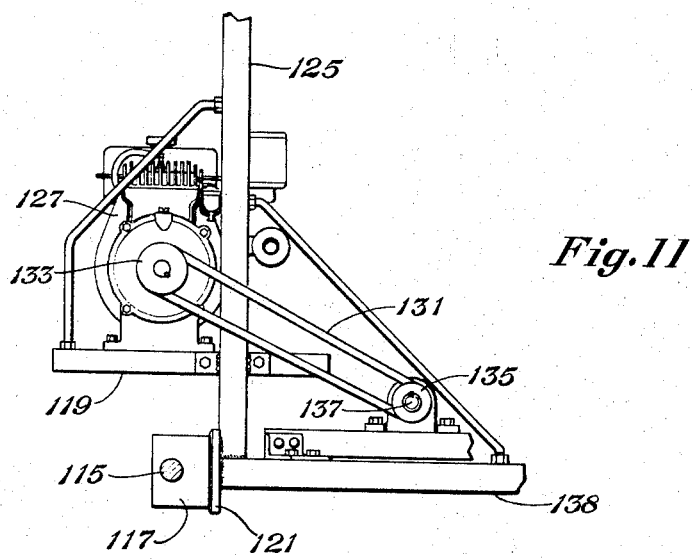
FIG. 11 is a fragmentary, side elevational view showing portions of the power train and the manner in which it is supported above the universal mounting of FIG. 10.

The vertical support member 125 secured to the face plate 121 is used to support the power means 127 (in this case an internal combustion engine). This is accomplished by attaching a horizontal member 129 to the vertical member 125 as is shown in FIG. 11. A drive mechanism is provided, shown here as a belt 131 secured to a pulley 133 on the power shaft of the internal combustion engine 127 and to the pulley 135 of the main drive shaft 137. This shaft is supported by a horizontal support member 138 which is attached to the face plate 121 as is shown in FIG. 10 and in FIG. 11.

Although not shown clearly in the drawing, the guide member 17 and the enclosed rotatable member 27 are supported by additional support members connected to the face plate 121 or to the horizontal member 138.

Thus, that part of the chassis 13 that supports the harvesting apparatus may be separated from the remainder of the chassis by merely removing the nut 123 and separating the face plate 121 from the bracket 117. In addition, this embodiment of my invention enables pivotal movement of the harvesting apparatus in both the vertical and horizontal planes.

Moreover, the rotatable member 27 and related apparatus, such as the guide member 17, etc., may be pivoted away from the ground when propulsion of the machine 11 but not harvesting is desired. This is accomplished by pulling on the handle 116 of vertical member 115. Suitable means such as a coil spring 118 spans the vertical member 115 and the chassis 13 to decreases the manual effort required for this operation.

The power train mechanism will now be described for the benefit of those who will ultimately desire to make and use my invention, though as stated previously, the means used to supply the power and to rotate the various elements can be varied widely. The belt 131 connects the pulley 133 on the internal combustion engine 127 and the pulley 135 on main drive shaft 137 as was previously stated. Referring once again to FIG. 1, it will be seen that the pulley 135 is the nearest one on main drive shaft 137. Another belt 139 is connected to the pulley 135 and is twisted by a plurality of pulleys designated 141, 143, 145, and 147, the function of which is to properly orient the belt 139 so that it drives the pulley 149 connected to central shaft 151 of the second conveyer 51. It is apparent, of course, that many arrangements of pulleys will achieve this same result, the one shown and described being merely illustrative. In this embodiment, however, the pulley 145 is supported by and drives a shaft 153 which is actually the central shaft of the auger 44.

On the opposite side of the main drive shaft 137 is a pulley 155 and a belt 40 connected to an idler pulley 159 and another pulley 38 which is connected to and drives the central shaft 29 of the rotatable member 27. Thus the embodiment shown and illustrated is completely driven by belts and pulleys, eliminating the need for expensive gears. The use of gears, however, is within the scope of the invention since any suitable power trained mechanism may be used.

The operation of the various components of my invention and, to some extent, the over-all operation thereof has previously been given to clarify the structural features. A more comprehensive explanation of its operation will now be given.

Some means (not shown) is provided for propelling and for steering the chassis 13 across the surface of the ground. This propulsion means, as previously indicated, may be an integral portion of the chassis 13 or may be a separate machine such as a conventional tractor or the like. The propulsion means or the steering means is not critical since they are not features of my invention.

The power means 127 is actuated to drive the various belts and pulleys that rotate the rotatable member 27, the first conveyer 44 and the second conveyer 51. The rotatable element or member 27 turns in the counterclockwise direction as the harvester 11 is propelled forward.

The impellers 33 with their flexible stem portions 41 and their enlarged lower portions 39 engage the nuts 35 on the surface 37 of the ground. This propels the nuts forward until they strike the housing or guide member 17 and are directed upwardly and rearwardly in a counterclockwise direction. The screen 45, interposed between the rotatable member 27 and the guide member 17, separates large pieces of undesirable materials such as the limb or twig 47 from the nuts, sending such material back to the surface of the ground 37. Meanwhile the nuts proceed rearwardly until they reach the first conveyer 44 which is disposed in a generally horizontal manner and which contains an auger that propels the nuts to the nearest end of the conveyer 44 as shown in FIG. 1.

The fan effect achieved by using pliable material 95 in front of the impellers 33, produces a stream of air flowing across conveyer 44 to blow small undesirable particles through the slots in the carriage 41 of the conveyer. The fingers 109, protruding through the elongated rods 105, as will be seen with reference to FIG. 6, cooperate with the auger 44 to further clean undesirable material from the nuts. Of course, the configuration of the rotatable member 27 with its cylindrical shell 101 formed of a porous material is beneficial in initially leaving undesirable material on the ground 37, as was previously explained. The provision of windows 23 in the end portions 21 of guide member 17 is beneficial for the same reason.

As the nuts leave the conveyer 44 they are raised by the second conveyer 51 and are transmitted to the container 45. The journey up this inclined structure with its elongated rods 113 being provided to further clean the nuts is the final step in the cleaning process.

In view of the foregoing description the many advantages of my invention are undoubtedly apparent. Particularly noteworthy, however, is the fact that my improved impeller construction leads to more efficiency by decreasing breakage of the nuts. At the same time the improved construction of the impellers is instrumental in reducing fatigue in the impellers and in the harvester in general. Moreover, the unique construction of the rotatable element in combination with the impeller arrangement and the guide member or housing decreases the amount of trash lifted from the ground. At the same time air is forced through the horizontal conveyer after passing through the end portions of the guide member and through the rotatable element to clean the nuts therein. Also, the conveyer arrangement is beneficial in further cleaning the nuts as they progress through the harvester.

The foregoing disclosure and the showings made in the drawings are merely illustrative of the principles of this invention and are not to be interpreted in a limiting sense.

I claim:

1. A nut harvesting machine comprising:
   a mobile chassis;
   a rotatable drum constructed of porous material and powered for rotation on the chassis;
   a plurality of impellers arranged in transverse rows, each impeller having a stem portion flexibly secured to the rotatable drum and each having a substantial portion of its mass concentrated at the lower region of said stem portion;
   an arcuate guide member having at least portions of each end formed of a porous material, said guide member being secured to the chassis and adapted to cover the rotatable element and the impellers to guide the nuts after impact with the impellers;
   a first, substantially horizontal conveyer disposed for powered rotation on the carriage and for communication with the guide member, said conveyer including an auger and a supporting carriage having a plurality of apertures in at least the lower portion thereof to separate small particles of trash from the nuts as they are propelled by the auger;
   a screen interposed between said first conveyer and the rotatable drum to prevent particles larger than nuts from reaching said first conveyer;
   a second conveyer secured to said chassis with one end communicating with said first conveyer and the opposite end in an elevated position, said conveyer including an auger and a carriage therearound having a plurality of apertures in at least the lower portion thereof to separate small particles of trash from the nuts as the auger propels them upwardly; and
   a plurality of resiliently mounted fingers on the carriage of said first conveyer said fingers being adapted to protrude through the apertures of said carriage to assist in separating the trash from the nuts.

2. A nut harvesting machine comprising:
   a mobile chassis;
   a rotatable element powered for rotation on the chassis;
   a multiplicity of impellers mounted on said rotatable element with stem portions that support protuberant nut impact portions which have at least the exterior thereof formed of a pliable shock absorbing material;
   freely flexible mounting means connecting said stem portions with said rotatable element, enabling said stem portions to freely and independently pivot in a plane substantially perpendicular relative to the rotational axis of said rotatable element at the point of contact with the nuts; and
   guide means on the chassis extending from ground level for guiding and collecting the nuts after impact.

3. The nut harvester defined by claim 2 wherein the stem portion of each impeller comprises two thin rigid arms having upper ends pivotally secured to said rotatable element, and each nut impact portion comprises a substantially cylindrical member rotatably interposed between the lower ends of said arms.

4. The nut harvester defined by claim 2 wherein an upper end of the stem portion of each impeller is rigidly secured to said rotatable element and is formed of a flexible material to enable pivotal movement of said nut impact portion.

5. A nut harvesting machine comprising:
   a mobile chassis;
   a rotatable element powered for rotation on the chassis;
   a multiplicity of impellers mounted on said rotatable element with stem portions and having protuberant nut impact portions which have at least the exterior thereof formed of a pliable shock absorbing material;
   said rotatable element being rotated at a speed such that said nut impact portions have a minimum speed of about 2350 f.p.m.;
   freely flexible mounting means connecting said stem portions with said rotatable element, enabling said stem portions to freely pivot in a plane substantially perpendicular relative to the rotational axis of said rotatable element at the point of contact with the nuts; and
   guide means carried by the chassis for collecting nuts after impact.

6. The nut harvester defined by claim 5 wherein the stem portion of each impeller comprises two thin rigid arms having upper ends pivotally secured to said rotatable element, and each nut impact portion comprises a substantially cylindrical member rotatably interposed between the lower ends of said arms.

7. The nut harvester defined by claim 5 wherein an upper end of the stem portion of each impeller is rigidly secured to said rotatable element and is formed of a flexible material to enable pivotal movement of said nut impact portion.

8. A nut harvesting machine comprising:
   a mobile chassis;
   a rotatable element powered for rotation on the chassis;
   a multiplicity of impellers mounted on said rotatable element with stem portions and having protuberant nut impact portions which have at least the exterior thereof formed of a pliable shock absorbing material;
   said rotatable element being rotated at a speed such that said nut impact portions have a minimum speed of about 2350 f.p.m.;
   said stem portion of each impeller comprising two thin rigid arms having upper ends pivotally secured to said rotatable element, and each nut impact portion comprising a substantially cylindrical member rotatably interposed between the lower ends of said arms; and
   guide means carried by the chassis for collecting nuts after impact.

References Cited

UNITED STATES PATENTS

| | | | |
|---|---|---|---|
| 117,634 | 8/1871 | Hulbert et al. | 198—229 X |
| 2,780,904 | 2/1957 | Bowie et al. | 56—400 X |
| 2,928,225 | 3/1960 | Spencer | 56—328 |
| 3,261,466 | 7/1966 | Holzenthal et al. | 209—120 |
| 2,609,149 | 9/1952 | Posselt. | |
| 3,308,613 | 3/1967 | Davidson | 56—328 |

ABRAHAM G. STONE, *Primary Examiner.*

P. A. RAZZANO, *Assistant Examiner.*